United States Patent
Hirai et al.

(10) Patent No.: US 9,557,777 B2
(45) Date of Patent: Jan. 31, 2017

(54) ELECTRONIC DEVICE AND HARNESS GUIDE

(71) Applicant: KABUSHIKI KAISHA TOSHIBA, Tokyo (JP)

(72) Inventors: Yuichi Hirai, Tokyo (JP); Motoki Tomita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 13 days.

(21) Appl. No.: 14/664,591

(22) Filed: Mar. 20, 2015

(65) Prior Publication Data

US 2015/0338890 A1 Nov. 26, 2015

(30) Foreign Application Priority Data

May 22, 2014 (JP) ................. 2014-106246

(51) Int. Cl.
*H05K 7/00* (2006.01)
*H05K 5/00* (2006.01)
*G11B 33/02* (2006.01)
*G06F 1/16* (2006.01)
*H02G 3/04* (2006.01)
*G06F 1/18* (2006.01)

(52) U.S. Cl.
CPC .......... *G06F 1/1681* (2013.01); *G06F 1/1616* (2013.01); *G06F 1/1683* (2013.01); *G06F 1/189* (2013.01); *H02G 3/0437* (2013.01)

(58) Field of Classification Search
CPC ...................................... G06G 1/162

USPC .................................... 361/679.28
See application file for complete search history.

(56) References Cited

U.S. PATENT DOCUMENTS

| | | | | |
|---|---|---|---|---|
| 2007/0058331 A1* | 3/2007 | Schwager | ............... | G06F 1/162 361/679.27 |
| 2009/0316348 A1* | 12/2009 | Tseng | ................... | G06F 1/1616 361/679.28 |

FOREIGN PATENT DOCUMENTS

| | | |
|---|---|---|
| JP | 2000-211445 | 8/2000 |
| JP | 2001-007562 | 1/2001 |
| JP | 2012-168985 | 9/2012 |

* cited by examiner

*Primary Examiner* — Jerry Wu
(74) *Attorney, Agent, or Firm* — Knobbe, Martens, Olson & Bear LLP

(57) ABSTRACT

According to one embodiment, an electronic device includes a first harness, a second harness and a housing. The first harness and the second harness are configured to electrically connect modules. The housing includes inside a wall portion forming a passage through which the first harness and the second harness pass, and a rib. The rib includes a first surface configured to control the first harness from moving in a first direction together with the wall portion and a second surface configured to control the second harness from moving in a second direction, which intersects the first direction, together with the wall portion and an outer surface of the first harness.

8 Claims, 10 Drawing Sheets

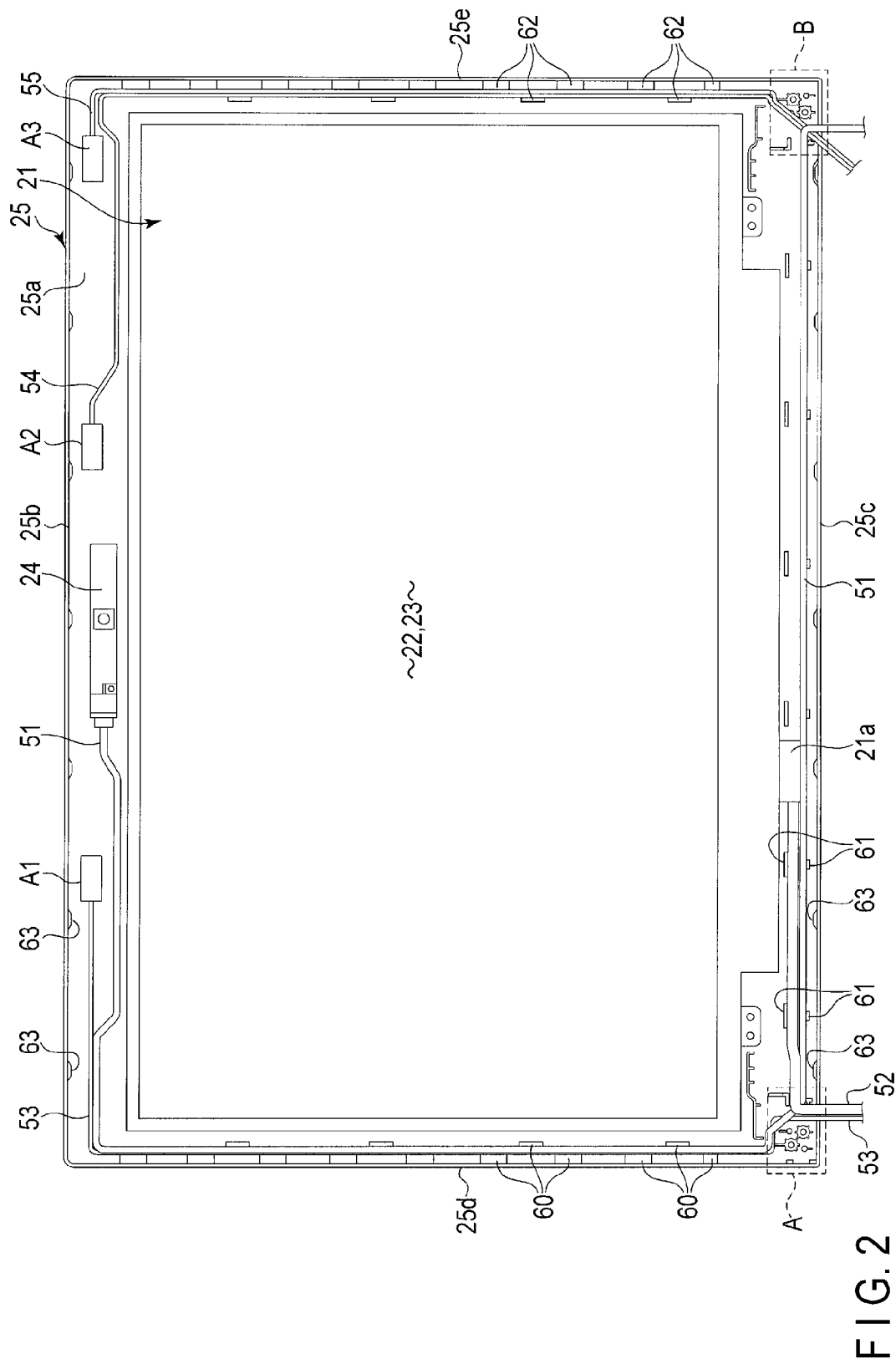
F I G. 2

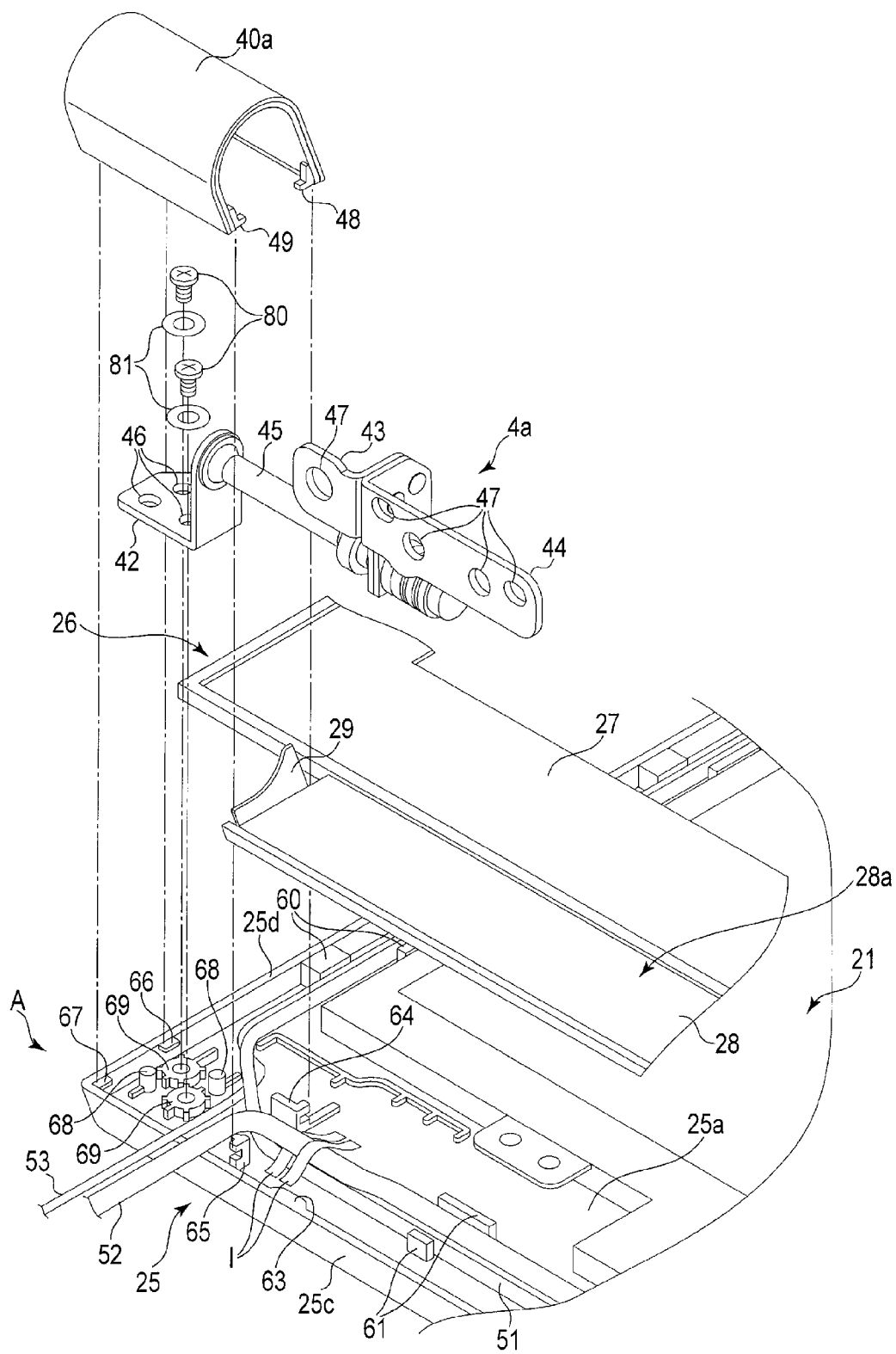
F I G. 3

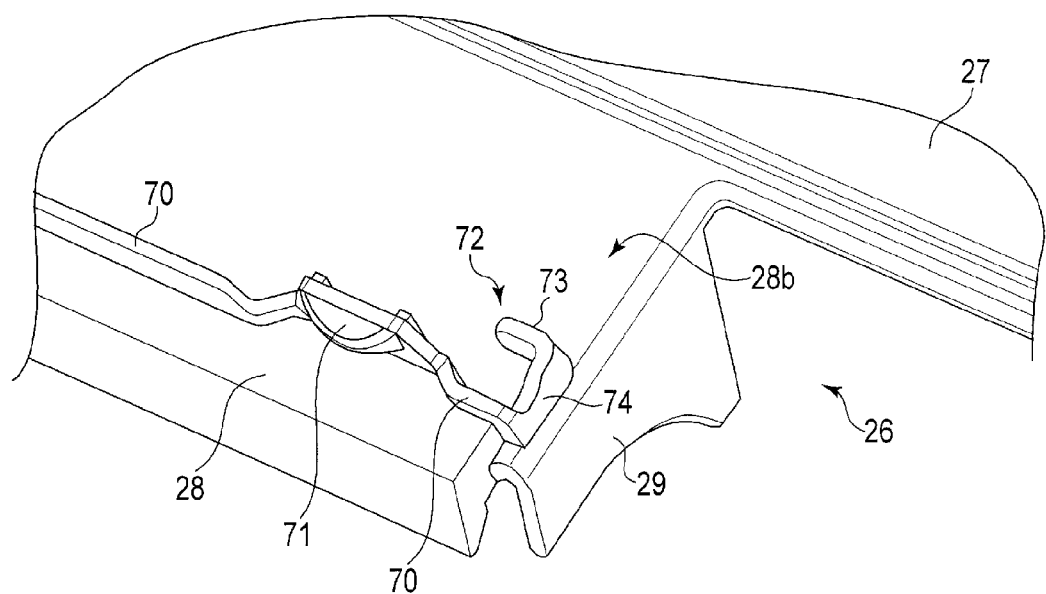
F I G. 4
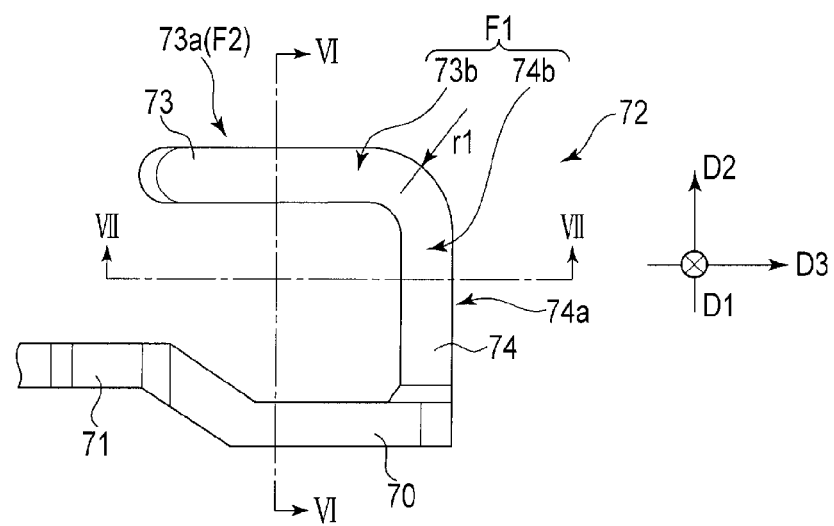
F I G. 5

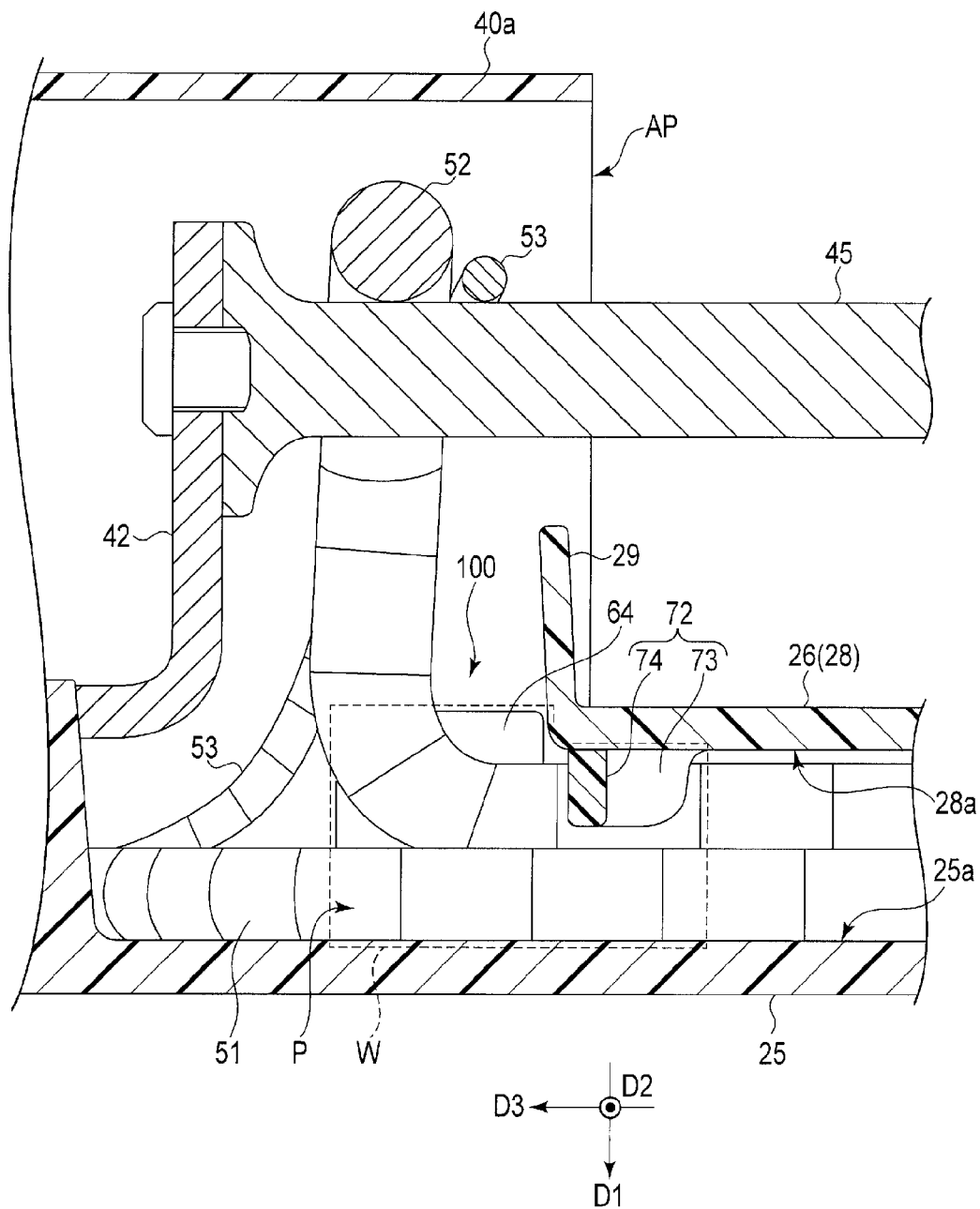
F I G. 10

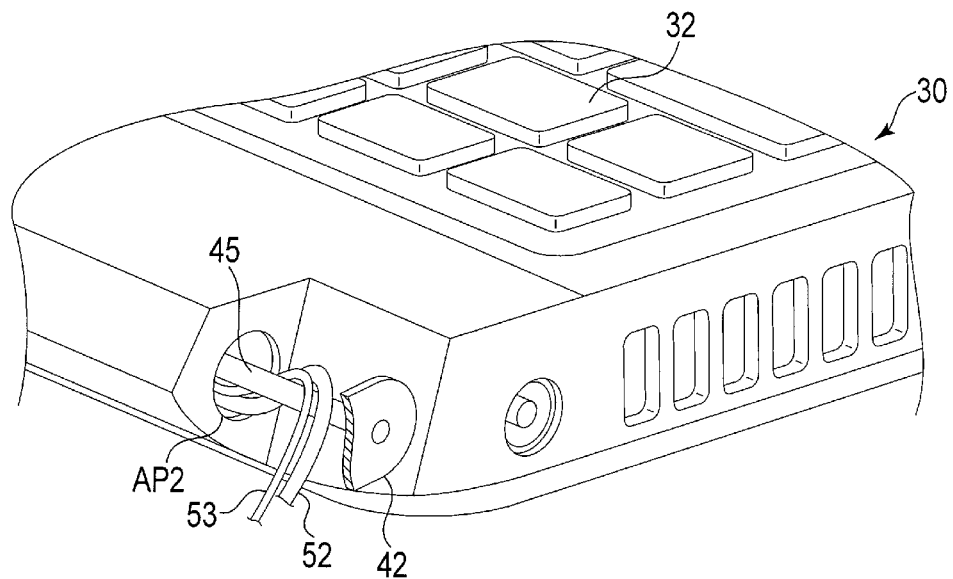
F I G. 11
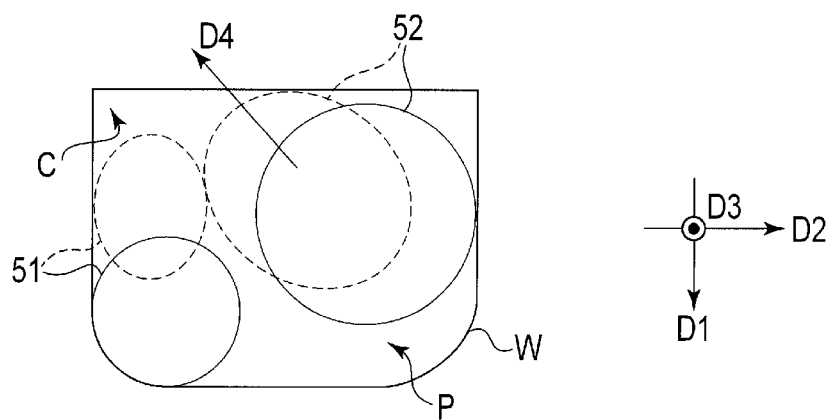
F I G. 12

ELECTRONIC DEVICE AND HARNESS GUIDE

CROSS-REFERENCE TO RELATED APPLICATIONS

This application is based upon and claims the benefit of priority from Japanese Patent Application No. 2014-106246, filed May 22, 2014, the entire contents of which are incorporated herein by reference.

FIELD

Embodiments described herein relate generally to an electronic device and a harness guide.

BACKGROUND

Electronic devices including a harness which electrically connects a plurality of modules are known.

It is desired to prevent defect such as harness disconnection and jacket damage.

An object of the present invention is to provide an electronic device and a harness guide capable of preventing inconvenience as to a harness.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary plan view illustrating an internal structure of a first housing which the electronic device includes.

FIG. 3 is an exemplary exploded perspective view illustrating a structure of the first housing and a hinge which the electronic device includes.

FIG. 4 is an exemplary perspective view illustrating an inner surface of a mask constituting the first housing.

FIG. 5 is a front view schematically illustrating a part of a guide rib and a wall rib provided in the mask.

FIG. 10 is a view schematically illustrating a part of a cross-section along line X-X in FIG. 8.

FIG. 11 is a perspective view schematically illustrating a vicinity of a location where the hinge is attached in a second housing which the electronic device includes.

FIG. 12 is a view schematically illustrating a passage which is not provided with the guide rib and a harness which passes through the passage.

DETAILED DESCRIPTION

Figure 1:
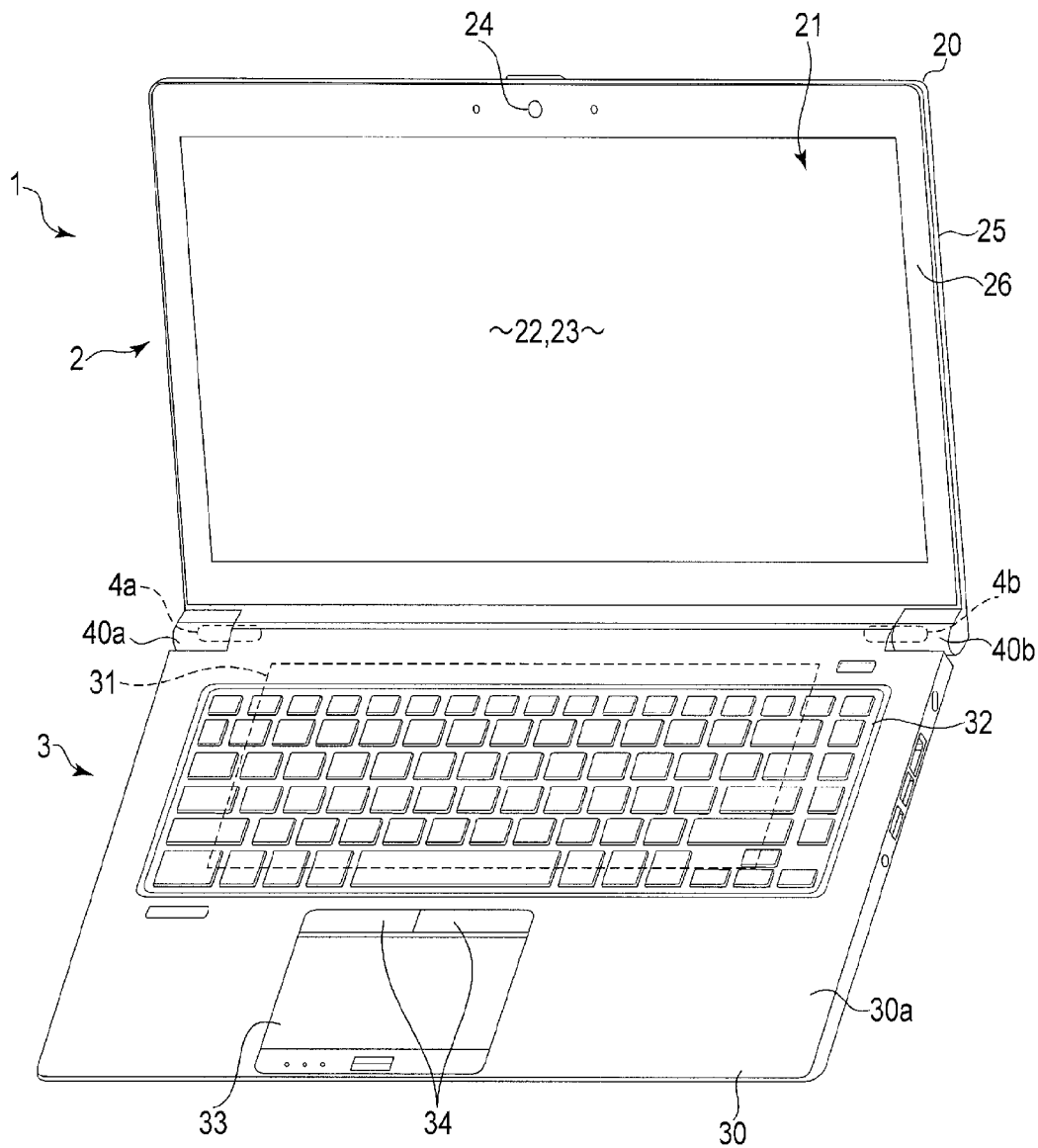
FIG. 1 is a perspective view of an electronic device of an embodiment.

Various embodiments will be described hereinafter with reference to the accompanying drawings.

In general, according to one embodiment, an electronic device includes a first harness, a second harness and a housing. The first harness and the second harness are configured to electrically connect modules. The housing includes inside a wall portion forming a passage through which the first harness and the second harness pass, and a rib. The rib includes a first surface configured to control the first harness from moving in a first direction together with the wall portion and a second surface configured to control the second harness from moving in a second direction, which intersects the first direction, together with the wall portion and an outer surface of the first harness.

In the drawings, while the width, thickness, shape, etc., of each element may be shown more schematically to further clarify explanation than in actual embodiments, this does not limit the interpretation of embodiments. The same elements may be given the same reference numbers to omit explanation.

FIG. 1 is a perspective view of an electronic device 1 of the present embodiment. The electronic device 1 is, for example, a notebook portable computer (notebook PC). The electronic device 1 includes a first unit 2, a second unit 3 and hinges 4a and 4b.

The first unit 2 includes a first housing 20. The first unit 2 is, for example, a display unit which accommodates a display device 21 in the first housing 20. The display device 21 includes a display panel 22 having a large number of display elements for displaying an image and a touch panel 23 (touch sensor or touch screen) arranged in lamination on the display panel 22. Various types of devices such as a liquid crystal display device and an organic electroluminescent display device is applicable to the display panel 22. Various types of modes such as a capacitive mode and a resistance film mode are applicable to the touch panel 23. The first unit 2 further includes a camera module 24 (camera or imaging device). The camera module 24 includes, for example, an imaging device such as a charge-coupled device (CCD) and a lens which focuses light on the imaging device.

The second unit 3 includes a second housing 30. The second unit 3 is, for example, a main unit which accommodates a circuit board 31 as a main board in the second housing 30. On an upper surface 30a of the second housing 30 is provided, for example, a keyboard 32, a touch pad 33 and a click button 34 as an input device. Note that the second unit 3 may include other types of input devices such as a touch panel instead of or in addition to these input devices.

The hinge 4a pivotally (openably and closably) connects the respective end portions (the end portions on the left in FIG. 1) of the first unit 2 and the second unit 3. The hinge 4b pivotally (openably and closably) connects the respective end portions (the end portions on the right in FIG. 1) of the first unit 2 and the second unit 3. By means of the hinges 4a and 4b, the first housing 20 can be pivoted with respect to the second housing 30 between a closed position where the first housing 20 and the second housing 30 are overlapped and an open position (position of FIG. 1) where the first housing 20 and the second housing 30 are open.

The first housing 20 and the second housing 30 are formed in a flat box shape by, for example, synthetic resin such as plastic. The first housing 20 includes a cover 25 and a mask 26. The cover 25 covers the back side of the display device 21 and is exposed outside in both the closed position and the open position. The mask 26 has an opening, to which the screen of the display device 21 is exposed. The mask 26 faces the upper surface 30a of the second housing 30 in the closed position and is exposed outside together with the display device 21 in the open position. In the present embodiment, a combination of the cover 25 and the mask 26 constitutes the first housing 20.

The first housing 20 further includes a hinge cover 40a and a hinge cover 40b. The hinge cover 40a covers over the hinge 4a together with the cover 25, the mask 26 and the second housing 30. The hinge cover 40b covers over the hinge 4b together with the cover 25, the mask 26 and the second housing 30.

Next, an exemplary structure of the first housing 20 will be described in detail.

FIG. 2 is an exemplary plan view illustrating an internal structure of the first housing 20. This plan view corresponds to a state where the mask 26 is removed in the first unit 2. The cover 25 includes a bottom surface 25a which is substantially rectangular and peripheral walls 25b, 25c, 25d and 25e which are provided in four sides of the bottom surface 25a, respectively. In FIG. 2, the peripheral walls 25b, 25c, 25d and 25e extend linearly along the edge portions of the upper side, the lower side, the left side and the right side of the bottom surface 25a, respectively.

A region encircled by a broken line frame in an angle portion, which is constituted by the peripheral wall 25c and the peripheral wall 25d, shows an attachment position A of the hinge 4a. A region encircled by a broken line frame in an angle portion, which is constituted by the peripheral wall 25c and the peripheral wall 25e, shows an attachment position B of the hinge 4b. The attachment positions A and B are also covered by the hinge covers 40a and 40b, respectively. The elements arranged in the attachment positions A and B will be described later in the explanation of FIG. 3.

The first housing 20 accommodates a first antenna A1, a second antenna A2 and a third antenna A3, in addition to the display device 21 and the camera module 24, between the display device 21 and the peripheral wall 25b. The display device 21, the camera module 24 and each of the antennas A1, A2 and A3 are fixed to, for example, the bottom surface 25a of the cover 25 in an appropriate manner.

Each of the antennas A1, A2 and A3 is an antenna for performing communication in compliance with, for example, any of wireless local area network (LAN), wireless wide area network (WAN), Worldwide Interoperability for Microwave Access (WiMAX [registered trademark]) and Bluetooth (registered trademark). Note that each of the antennas A1, A2 and A3 may be an antenna for performing communication in compliance with other communication standards. Also, the electronic device 1 may not include any of the antennas A1, A2 and A3, or at least a part of the antennas A1, A2 and A3 may be provided in the second housing 30.

The first housing 20 further accommodates a first harness 51, a second harness 52, a third harness 53, a fourth harness 54 and a fifth harness 55. Each of the harnesses 51, 52, 53, 54 and 55 has a conductive line for electrically connecting a plurality of modules. This conductive line is covered by, for example, an insulating jacket. Each of the harnesses 51, 52, 53, 54 and 55 may bundle a plurality of conductive lines covered by a jacket as described above. Each of the harnesses 51, 52, 53, 54 and 55 is also called a wire harness, a cable harness, a cable, etc. An end portion (first end portion) of each of the harnesses 51, 52, 53, 54 and 55 is positioned inside the first housing 20 and the other end portion (second end portion) is positioned inside the second housing 30.

Inside the first housing 20, the first end portion of the first harness 51 is connected to a first module. The first module is, for example, the camera module 24. The first harness 51 is guided by protrusions 60 provided in a plurality of positions of the cover 25 along the peripheral wall 25d, protrusions 61 provided in a plurality of positions of the cover 25 along the peripheral wall 25c, etc., and extends in the attachment position B through the attachment position A. The first harness 51 further extends inside the second housing 30 from the attachment position B via the hinge cover 40b. Inside the second housing 30, the second end portion of the first harness 51 is connected to a second module. The second module is, for example, the circuit board 31.

Inside the first housing 20, the first end portion of the second harness 52 is connected to a third module. The third module is, for example, the display device 21. In the example of FIG. 2, the second harness 52 is connected to the display device 21 via a connector 21a. The second harness 52 is guided by the protrusions 61, etc., extends in the attachment position A, and extends inside the second housing 30 via the hinge cover 40a. Inside the second housing 30, the second end portion of the second harness 52 is connected to a fourth module. The fourth module is, for example, the circuit board 31.

Inside the first housing 20, the first end portion of the third harness 53 is connected to a fifth module. The fifth module is, for example, the first antenna A1. The third harness 53 is guided by the protrusions 61, etc., extends in the attachment position A, and extends inside the second housing 30 via the hinge cover 40a. Inside the second housing 30, the second end portion of the third harness 53 is connected to a sixth module. The sixth module is, for example, the circuit board 31.

Inside the first housing 20, the first end portion of the fourth harness 54 is connected to a seventh module. The seventh module is, for example, the second antenna A2. Inside the first housing 20, the first end portion of the fifth harness 55 is connected to an eighth module. The eighth module is, for example, the third antenna A3. The fourth harness 54 and the fifth harness 55 are guided by protrusions 62 provided in a plurality of positions of the cover 25 along the peripheral wall 25e, etc., extend in the attachment position B, and extend inside the second housing 30 via the hinge cover 40b. Inside the second housing 30, the second end portion of the fourth harness 54 is connected to a ninth module. Inside the second housing 30, the second end portion of the fifth harness 55 is connected to a tenth module. The ninth module and the tenth module are, for example, the circuit board 31.

The second, fourth, sixth, ninth and tenth modules are not necessarily the same module as in the circuit board 31. These modules may differ from each other.

Note that a plurality of protrusions 63 are provided on the peripheral wall 25b and the peripheral wall 25c. Each of the protrusions 63 engages with a plurality of claw portions 71 (see FIG. 4) provided in the mask 26, respectively. This engagement makes the mask 26 attached to the cover 25.

Next, a detailed structure of the first housing 20 and the hinges 4a and 4b will be described with reference to FIGS. 3 and 4.

FIG. 3 is an exemplary exploded perspective view illustrating the structure of the first housing 20 and the hinge 4a. Note that FIG. 3 shows the structures of the hinge 4a and the first housing 20 in the vicinity of the attachment position A.

On the bottom surface 25a of the cover 25 are provided first engaging portions 64 and 65 in the vicinity of the attachment position A. Also, on the peripheral wall 25d of the cover 25 are provided first engaging portions 66 and 67 in the vicinity of the attachment position A. Further, on the bottom surface 25a of the cover 25 are provided a pair of pins 68 and a pair of female screws 69 (boss) within a range encircled by the first engaging portions 64 to 67.

The first harness 51 and the second harness 52 are fixed to the bottom surface 25a of the cover 25 by an insulator I in the vicinity of the first engaging portions 64 and 65. The insulator I is, for example, an insulating tape. Note that the first harness 51 and the second harness 52 are fixed to the bottom surface 25a, etc., by the insulator I in a plurality of positions in the first housing 20 as well as in the vicinity of the first engaging portions 64 and 65. Also, the third harness 53, the fourth harness 54 and the fifth harness 55 are fixed to the bottom surface 25a, etc., by the insulator I in a plurality of positions in the first housing 20.

The mask 26 includes a first portion 27, a second portion 28 and a third portion 29. The first portion 27 has a frame shape which holds the peripheral edge portion of the display device 21 together with the cover 25. The second portion 28 extends from the first portion 27 in a direction of the peripheral wall 25c of the cover 25, except the portions corresponding to the attachment positions A and B. The third portion 29 extends from an outer surface 28a of the second portion 28 in a thickness direction of the second portion 28 in the end portion in a longitudinal direction (for example, a direction parallel to a hinge axis 45) of the second portion 28.

The hinge 4a includes a first fixing portion 42 (first fixing plate), a second fixing portion 43 (second fixing plate), a third fixing portion 44 (third fixing plate) and the hinge axis 45. An end of the hinge axis 45 is fixedly connected to the first fixing portion 42. The second fixing portion 43 and the third fixing portion 44 are pivotally connected to the hinge axis 45. The first fixing portion 42 has four holes 46 (through-holes) corresponding to the pair of pins 68 and the pair of female screws 69 of the cover 25, respectively. Note that three of the four holes 46 are shown in FIG. 3. The second fixing portion 43 and the third fixing portion 44 include a hole 47 for attaching the hinge 4a to the second housing 30.

The hinge 4a is fixed to the cover 25 in a state where, for example, the mask 26 is attached to the cover 25. Specifically, the hinge 4a is fixed to the cover 25 by inserting the pair of pins 68 into two of the four holes 46 of the first fixing portion 42 and further by screwing male screws 80 into each of the female screws 69 via the remaining two holes 46 and a washer 81.

The hinge cover 40a has inside a space where the side of the cover 25 and the side of the third portion 29 of the mask 26 are open and where the first fixing portion 42 of the hinge 4a and a part of the hinge axis 45 can be accommodated. On the inner wall of the hinge cover 40a are provided a second engaging portion 48 which engages with the first engaging portion 64 and a second engaging portion 49 which engages with the first engaging portion 65. Note that while not shown in FIG. 3, second engaging portions which engage with the first engaging portions 66 and 67, respectively, are also provided on the inner wall of the hinge cover 40a. Each of the second engaging portions (48 and 49, and the two not shown) is, for example, a hook. Each of the engaging portions 64 to 67 is, for example, a claw portion which receives the hook.

The hinge cover 40a is fixed to the cover 25 by engaging each of the second engaging portions with each of the first engaging portions 64 to 67 in a state where, for example, the mask 26 and the hinge 4a are attached to the cover 25.

Note that the explanation of the structure in the vicinity of the attachment position B of the cover 25 and the mask 26 and the structures of the hinge 4b and the hinge cover 40b is omitted as being the same as the structure in FIG. 3.

FIG. 4 is an exemplary perspective view illustrating the inner surface of the mask 26 (a surface on a side facing the cover 25). FIG. 4 shows the inner surface of the mask 26 in the vicinity of the attachment position A shown in FIG. 3.

As shown in FIG. 4, a wall rib 70 (wall, protrusion or structure) extending along a longitudinal direction of the second portion 28 is provided on an inner surface 28b of the second portion 28, which is positioned opposite the outer surface 28a. The wall rib 70 is provided with the claw portions 71 (protrusions) protruding toward the opposite side of the first portion 27. Note that while only one of the claw portions 71 is shown in FIG. 4, the wall rib 70 is provided with the claw portion 71 in the respective position corresponding to each of the protrusions 63, which are provided on the peripheral wall 25c of the cover 25. A wall rib is also provided near the end portion of the first portion 27 on a side where the second portion 28 is not provided. This wall rib is provided with the claw portion 71 in the respective position corresponding to each of the protrusions 63, which are provided on the peripheral wall 25b of the cover 25.

Each of the claw portions 71 engages with the protrusions 63 provided in a position corresponding to the peripheral wall 25b or the peripheral wall 25c of the cover 25, respectively. This engagement makes the mask 26 attached to the cover 25.

A guide rib 72 curved in an L-shape is provided in the end portion on the side of the third portion 29 of the wall rib 70. The guide rib 72 includes a first portion 73 and a second portion 74. The end portion on the side of the second portion 74, which is not connected to the first portion 73, is connected to the wall rib 70. The wall rib 70 and the guide rib 72 are integrally formed by synthetic resin together with, for example, the second portion 28 of the mask 26.

A detailed shape of the guide rib 72 will be described with reference to FIGS. 5 to 7.

FIG. 5 is a front view schematically illustrating a part of the guide rib 72 and the wall rib 70. FIG. 6 is a view schematically illustrating a cross-section along line VI-VI in FIG. 5. FIG. 7 is a view schematically illustrating a cross-section along line VII-VII in FIG. 5. In FIGS. 5 to 7, a direction in which the wall rib 70 and the first portion 73 and the second portion 74 of the guide rib 72 protrude from the inner surface of the mask 26 (the inner surface 28b of the second portion 28) is defined as a first direction D1. In addition, a lateral direction and a longitudinal direction of the second portion 28 of the mask 26 are defined as a second direction D2 and a third direction D3, respectively. The first direction D1 coincides with, for example, a thickness direction of the first housing 20 or a normal direction of the inner surface 28b. The second direction D2 coincides with, for example, a vertical direction of the display surface of the display device 21 or a direction perpendicular to the hinge axis 45 in a plane parallel to the inner surface 28b. The third direction D3 coincides with, for example, a horizontal direction of the display surface of the display device 21 or a direction parallel to the hinge axis 45. For example, the first direction D1, the second direction D2 and the third direction D3 perpendicularly intersect each other.

As shown in FIG. 5, the first portion 73 of the guide rib 72 extends along the third direction D3. Also, the wall rib 70 extends along the third direction D3 while being partially curved. The second portion 74 of the guide rib 72 extends along the second direction D2. In the following explanation, a side surface of the first portion 73 positioned opposite the wall rib 70 is called a first side surface 73a and a side surface of the second portion 74 connected to the first side surface 73a is called a second side surface 74a. The first side surface 73a extends along the third direction D3. The second side surface 74a extends along the second direction D2.

In addition, a tip surface in the first direction D1 of the first portion 73 is called a first tip surface 73b and a tip surface in the first direction D1 of the second portion 74 is called a second tip surface 74b. Note that a combination of the first tip surface 73b and the second tip surface 74b may be called a first surface F1. Also, the first side surface 73a may be called a second surface F2.

As shown in FIG. 5, the connecting portion between the first side surface 73a and the second side surface 74a is curved in an arc shape of radius r1. The first side surface 73a and the second side surface 74a are thereby connected smoothly.

Figure 6:
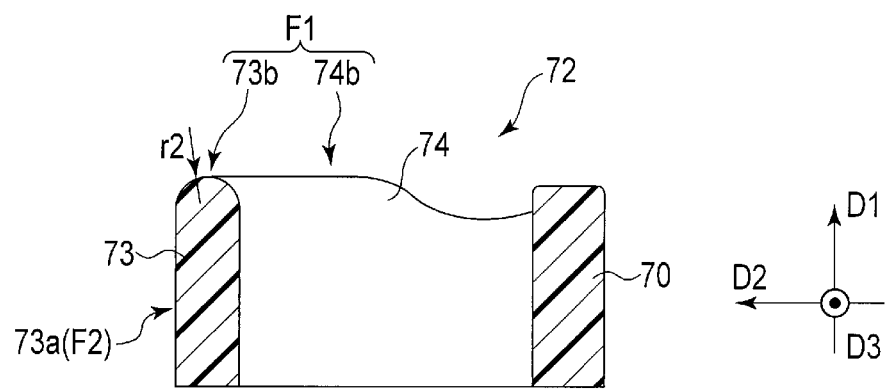
FIG. 6 is a view schematically illustrating a cross-section along line VI-VI in FIG. 5.
Figure 7:
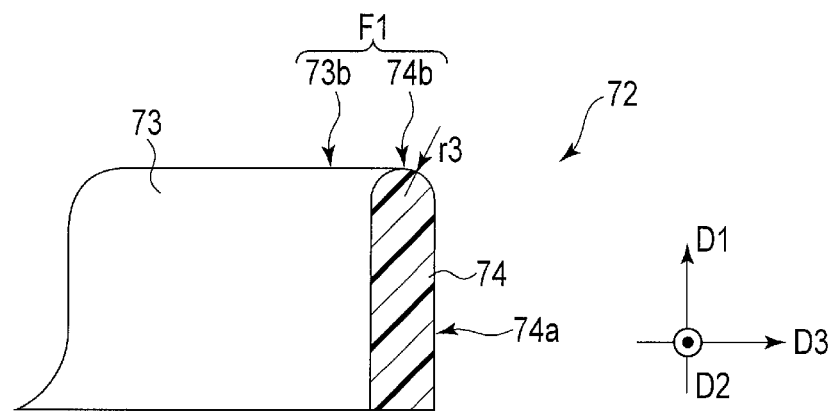
FIG. 7 is a view schematically illustrating a cross-section along line VII-VII in FIG. 5.

As shown in FIG. 6, the first tip surface 73b is chamfered in an arc shape of radius r2. Also, as shown in FIG. 7, the second tip surface 74b is chamfered in an arc shape of radius r3. Radii r2 and r3 are, for example, smaller than radius r1. Radii r2 and r3 are, for example, substantially the same. Note that the connecting portion between the first tip surface 73b and the second tip surface 74b is chamfered in an arc shape of radius r2, radius r3 or a radius different from radii r2 and r3. That is, the first surface F1 is a smooth curved surface where all of the regions are chamfered in an arc shape.

Note that the wall rib 70, the claw portions 71 and the guide rib 72 having the same structure as shown in FIGS. 4 to 7 are provided also in the vicinity of the attachment position B of the mask 26.

Next, an example of how a harness is pulled around with the second housing 30 attached to the first housing 20 via the hinges 4a and 4b will be described in detail with reference to FIGS. 8 to 11.

Figure 8:
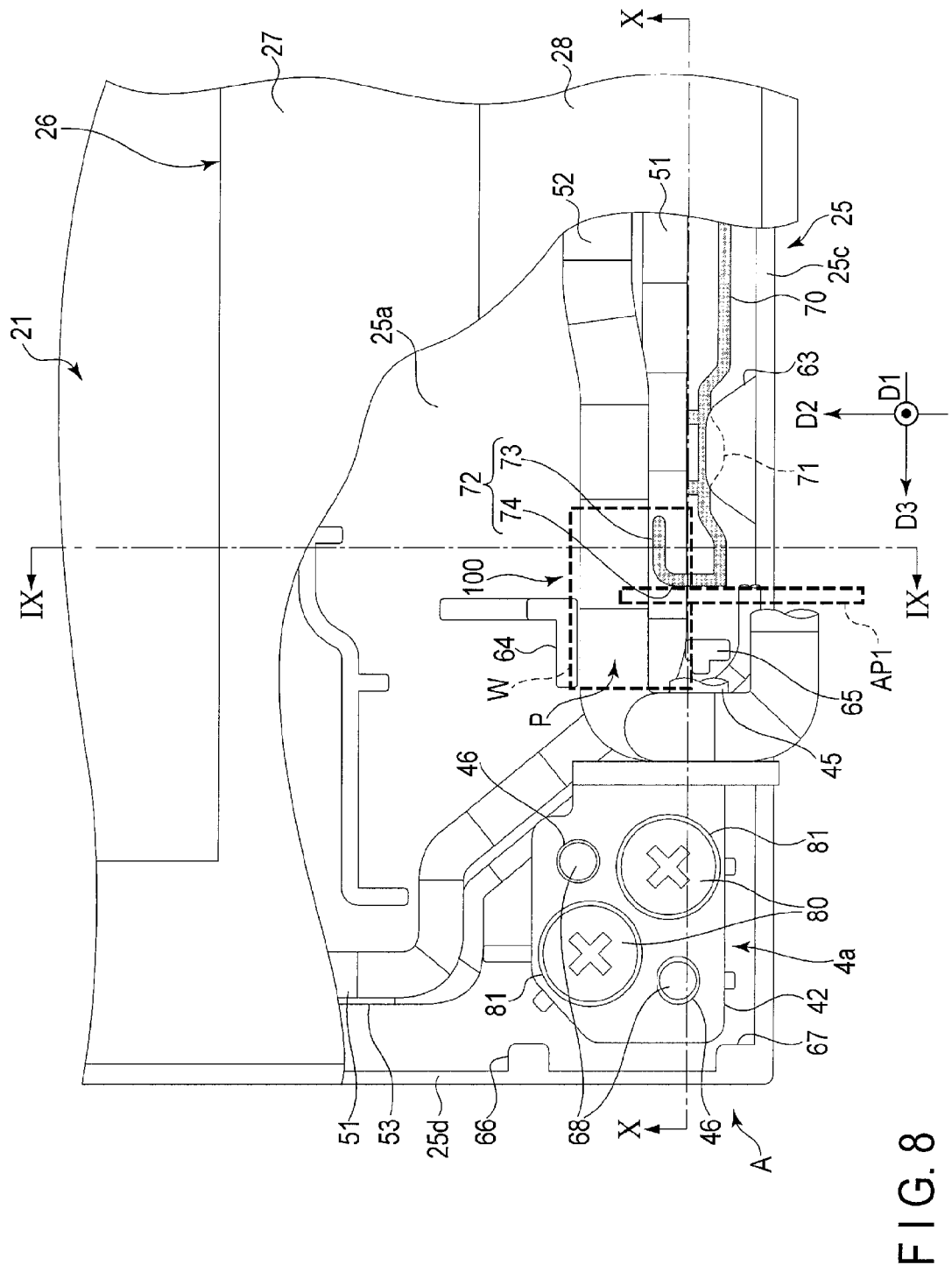
FIG. 8 is a front view schematically illustrating a part of the first housing.
Figure 9:
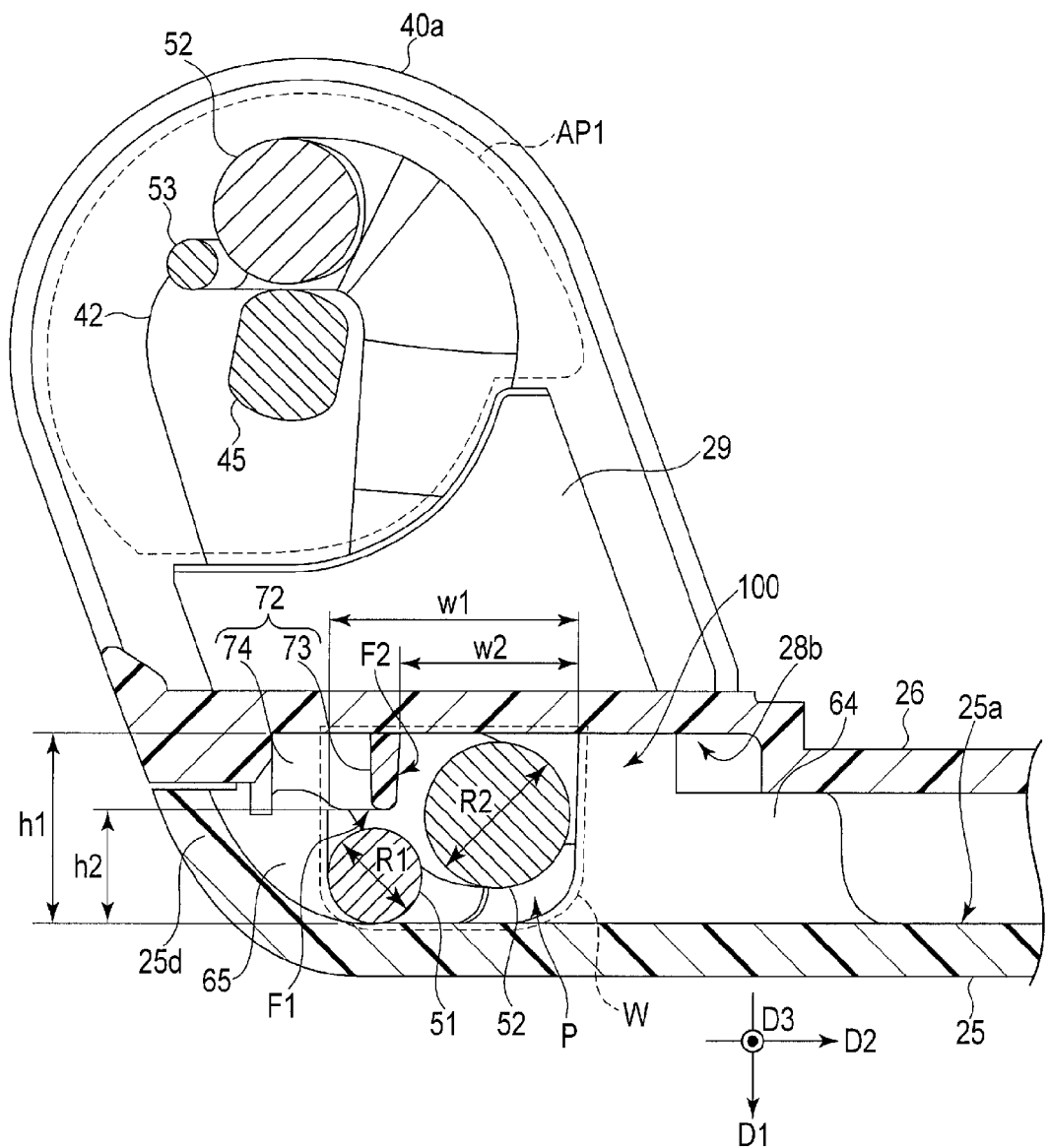
FIG. 9 is a view schematically illustrating a part of a cross-section along line IX-IX in FIG. 8.

FIG. 8 is a front view schematically illustrating a part of the first housing 20. FIG. 9 is a view schematically illustrating a part of a cross-section along line IX-IX in FIG. 8. FIG. 10 is a view schematically illustrating a part of a cross-section along line X-X in FIG. 8. FIG. 11 is a perspective view schematically illustrating the vicinity of a location where the hinge 4a is attached in the second housing 30.

Note in FIG. 8 that the mask 26 is cut away in the vicinity of the attachment position A and the hinge cover 40a is not shown. As to the hinge 4a, a part of the hinge axis 45, the second fixing portion 43 and the third fixing portion 44 are not shown. For explanation, a part of the wall rib 70, the claw portions 71 and the guide rib 72 are shown in a region where the mask 26 is cut away. Also, the insulator I is not shown.

As shown in FIGS. 8 to 10, a passage P, through which the first harness 51 and the second harness 52 pass, is formed in the end portion on the side of the attachment position A of the second portion 28 of the mask 26. In the present embodiment, the passage P is formed by the bottom surface 25a of the cover 25, the inner surface of the mask 26 (the inner surface 28b of the second portion 28) and a wall portion W which is constituted by the side surfaces of the first engaging portions 64 and 65. Note that the wall portion W may be constituted by other elements provided inside the first housing 20, not limited to the above-mentioned embodiment. Such elements may be formed integrally with the first housing 20, or a housing different from the first housing 20 may be fixed to the first housing 20.

In the present embodiment, the wall portion W and the guide rib 72 constitute a harness guide 100. The definition of the harness guide 100 may include other elements contacting with each of the harnesses 51 to 55 such as the protrusions 60, 61 and 62, the hinges 4a and 4b, the second housing 30, and the structure inside the second housing 30.

As shown in FIGS. 8 to 10, a first opening AP1, through which the hinge axis 45 pass, is formed between the third portion 29 of the mask 26 and the hinge cover 40a. Also, as shown in FIG. 11, a second opening AP2, through which the hinge axis 45 pass, is formed in the second housing 30. Note that the first opening AP1 and the second opening AP2 are formed similarly on the side of the attachment position B.

As shown in FIG. 8, the first harness 51 extends in a direction which substantially coincides with the second direction D2, in a position closer to the peripheral wall 25d of the cover 25. The first harness 51 is curved in the attachment position A to pass through the passage P. The first harness 51 extends in a direction which substantially coincides with the third direction D3, in a position closer to the peripheral wall 25c of the cover 25.

The second harness 52 extends side by side with the first harness 51 in a position closer to the peripheral wall 25c of the cover 25. The second harness 52 is curved in the attachment position A, hung to the hinge axis 45, and extends outside of the first housing 20 from the first opening AP1.

The third harness 53 extends side by side with the first harness 51 in a position closer to the peripheral wall 25d of the cover 25. The third harness 53 is curved in the attachment position A, hung to the hinge axis 45, and extends outside of the first housing 20 from the first opening AP1, as with the second harness 52.

As shown in FIG. 11, the second harness 52 and the third harness 53 extending outside of the first housing 20 pass through the second opening AP2 inside the second housing 30 and is connected to a module such as the circuit board 31 as mentioned above.

The first harness 51, the fourth harness 54 and the fifth harness 55 pass through the first opening AP1 and the second opening AP2 on the side of the attachment position B, extends inside the second housing 30 and is connected to a module such as the circuit board 31.

In the present embodiment, it is exemplified that the first harness 51 pass through the first opening AP1 and the second opening AP2 on the side of the attachment position B and the second harness 52 pass through the first opening AP1 and the second opening AP2 on the side of the attachment position A. However, the way of pulling around the first harness 51 and the second harness 52 may be changed so that both the first harness 51 and the second harness 52 pass through the first opening AP1 and the second opening AP2 on the side of the attachment position A or so that both the first harness 51 and the second harness 52 pass through the first opening AP1 and the second opening AP2 on the side of the attachment position B.

As shown in FIG. 9, a part of the first portion 73 and the second portion 74 of the guide rib 72 protrudes to the passage P to block a part of the passage P. In the cross-section (a surface parallel to the first direction D1 and the second direction D2) shown in FIG. 9, a height in the first direction D1 of the passage P (a distance from the inner surface 28b of the second portion 28 of the mask 26 to the bottom surface 25a of the cover 25) is defined as h1, and a width in the second direction D2 of the passage P (a distance between the side surfaces of the first engaging portions 64 and 65) is defined as w1. Also, a height from the first surface F1 of the guide rib 72 to the bottom surface 25a of the cover 25 is defined as h2, a width from the second surface F2 of the guide rib 72 to the side surface of the first engaging portion 64 is defined as w2, the diameter of the first harness 51 is defined as R1, and the diameter of the second harness 52 is defined as R2. In the example of FIG. 9, diameter R1 is smaller than diameter R2 (R1<R2).

In the example of FIG. 9, height h1 is smaller than the sum of diameter R1 and diameter R2 (h1<R1+R2). Therefore, the first harness 51 and the second harness 52 cannot pass through the passage P by being arranged side by side with the first direction D1. Also, width w1 is smaller than the sum of diameter R1 and diameter R2 (w1<R1+R2). Therefore, the first harness 51 and the second harness 52 cannot pass through the passage P by being arranged side by side with the second direction D2.

In the relationship between height h1, width w1, diameter R1 and diameter R2, the first harness 51 and the second harness 52 pass through the passage P by being arranged side by side in a direction shifted from the first direction D1 and the second direction D2, as shown in FIG. 9. Specifically, the first harness 51 passes between the first surface F1 and the bottom surface 25a of the cover 25, and the second harness 52 passes between the second surface F2 and the side surface of the first engaging portion 64.

In the example of FIG. 9, height h2 is larger than diameter R1 (R1<h2). That is, the first harness 51 is accommodated with play between the first surface F1 and the bottom surface 25a of the cover 25. Also, width w2 is larger than diameter R2 (R2<w2). That is, the second harness 52 is accommodated with play between the second surface F2 and the side surface of the first engaging portion 64.

Here, an example of the assembly process of the electronic device 1 will be described.

First of all, a module to which the first end portion of each of the harnesses 51 to 55 such as the camera module 24, the display device 21 and the antennas A1 to A3 is attached to each position of the cover 25 shown in FIG. 2. Next, the first harness 51, the third harness 53, the fourth harness 54 and the fifth harness 55 are pulled around the display device 21 as shown in FIG. 2. At this time, the first harness 51 is brought close to the first engaging portion 65 between the first engaging portions 64 and 65. Each of the harnesses 51 and 53 to 55 is fixed to the bottom surface 25a in an appropriate position by the insulator I.

After fixing at least the first harness 51 by the insulator I, the second harness 52 is pulled around to the attachment position A. At this time, the second harness 52 is brought close to the first engaging portion 64 between the first engaging portions 64 and 65 and fixed to the bottom surface 25a in an appropriate position by the insulator I. Since width w1 of the passage P is smaller than the sum of diameters R1 and R2 of the first harness 51 and the second harness 52, a part of the second harness 52 is mounted on the first harness 51 between the first engaging portions 64 and 65.

Subsequently, the mask 26 is attached to the cover 25, which forms the passage P. In the passage P, the positional relationship between the guide rib 72, the first harness 51 and the second harness 52 is as shown in FIG. 9.

Thereafter, the first fixing portion 42 of the hinges 4a and 4b is attached to the attachment positions A and B, respectively, and the second fixing portion 43 and the third fixing portion 44 of the hinges 4a and 4b are attached to a predetermined position in the second housing 30, respectively. The second harness 52 and the third harness 53 are pulled around inside the second housing 30 via the attachment position A and connect the second end portion to, for example, the circuit board 31. The first harness 51, the fourth harness 54 and the fifth harness 55 are pulled around inside the second housing 30 via the attachment position B and connect the second end portion to, for example, the circuit board 31. Lastly, the hinge covers 40a and 40b are attached to the cover 25 to complete the electronic device 1. Note that the above-described assembly process can be implemented by changing the order appropriately.

Figure 13:
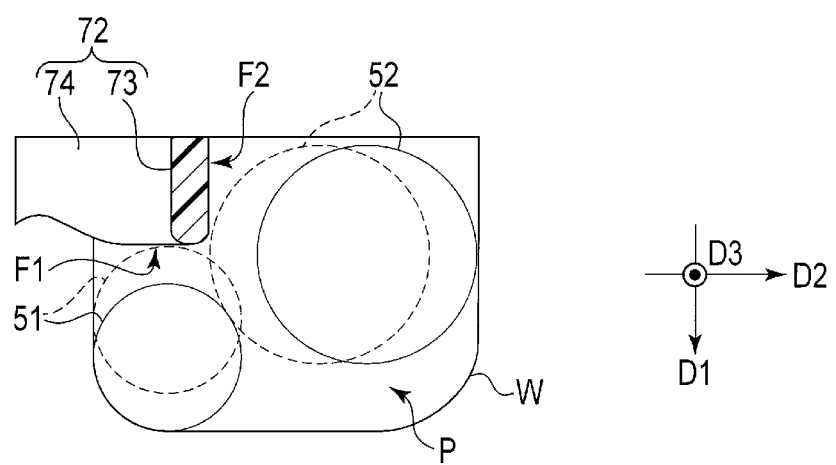
FIG. 13 is a view schematically illustrating a passage which is provided with the guide rib and a harness which passes through the passage.

Next, an example of the effect of the harness guide 100 will be described with reference to FIGS. 12 and 13. FIG. 12 is a view schematically illustrating the passage P which is not provided with the guide rib 72 and the first harness 51 and the second harness 52 which pass through the passage P. On the other hand, FIG. 13 is a view schematically illustrating the passage P which is provided with the guide rib 72 and the first harness 51 and the second harness 52 which pass through the passage P. FIGS. 12 and 13 both show the same cross-section as FIG. 9 (a surface parallel to the first direction D1 and the second direction D2).

There is a case where the first harness 51 and the second harness 52 move in the passage P when the first housing 20 is pivoted with respect to the second housing 30 by the hinges 4a and 4b. Such movement can arise from the change in a tension applied to the first harness 51 and the second harness 52, the twist of the first harness 51 and the second harness 52, the elimination of the twist, etc. Also, the insulator I which fixes the first harness 51 and the second harness 52 in the vicinity of the passage P can be peeled off by such movement. When the insulator I is peeled off, the first harness 51 and the second harness 52 can be moved easily.

When the guide rib 72 is not provided, the first harness 51 and the second harness 52 pass through the passage P with much clearance as shown in FIG. 12. This allows the first harness 51 and the second harness 52 to move around relatively freely when the first housing 20 is pivoted. Due to this movement, the first harness 51 and the second harness 52 can friction with each other, or the first harness 51 and the second harness 52 can friction with the wall portion W to damage the jackets of the first harness 51 and the second harness 52.

Also, as shown in a broken line in, for example, FIG. 12, the first harness 51 and the second harness 52 can be sandwiched by the surface of the jacket of the first harness 51 or the second harness 52 and the wall portion W for example, as being brought close to the angle of the passage P. When the first harness 51 and the second harness 52 are sandwiched in such a manner, the jacket can be badly damaged, and in the worse case, the first harness 51 and the second harness 52 can be disconnected.

The second harness 52 is curved toward the first opening AP1 in a position of passing through from the passage P to the attachment position A of the hinge 4a. Therefore, as the first housing 20 is pivoted, the second harness 52 can be pulled with a strong force in a fourth direction D4 (a direction toward the first opening AP1) shown in FIG. 12. When the second harness 52 is pulled in the fourth direction D4 with the first harness 51, the first harness 51 and the second harness 52 can be sandwiched in an angle portion C of the passage P. Note that the angle portion C is a position to be blocked by the guide rib 72 when the guide rib 72 is provided.

On the other hand, when the guide rib 72 is provided as shown in FIG. 13, the movement of the first harness 51 and the second harness 52 is controlled by the guide rib 72. Specifically, the first surface F1 and the wall portion W (the bottom surface 25a of the cover 25) controls the first harness 51 from moving in the first direction D1 and its opposite direction. Also, the surface of the jacket of the second harness 52 and the wall portion W control the first harness 51 from moving in the second direction D2 and its opposite direction. Further, the second surface F2, the surface of the jacket of the first harness 51 and the wall portion W (the side surface of the first engaging portion 64) control the second harness 52 from moving in the second direction D2 and its opposite direction.

Thus, when the guide rib 72 is provided, the range of movement of the first harness 51 and the second harness 52 is reduced as the movement of these harnesses is controlled. Since this prevents or reduces the occurrence of the friction and sandwiching of the first harness 51 and the second harness 52, it is possible to prevent the jacket damage and the disconnection of the first harness 51 and the second harness 52.

Also, since the guide rib 72 is provided in the angle portion C of the passage P, it is possible to prevent sandwiching in the angle portion C.

Further, the insulator I is less likely to be peeled off since the movement of the first harness 51 and the second harness 52 is controlled. In other words, even if the insulator I is peeled off, it is possible to control the movement of the first harness 51 and the second harness 52 by means of the harness guide 100 of the present embodiment.

Recently, the housings of electronic devices such as notebook portable computers are becoming narrower, and the width of a frame encircling a display device in such an electronic device is becoming narrower. Also, when a touch panel function is incorporated in a display device, the number of signal lines increases and the wire diameter of a harness extending from the display device becomes thicker. It is therefore difficult to provide in a housing a structure of guiding a plurality of harnesses separately. On the other hand, the harness guide 100 of the present embodiment is configured to guide the first harness 51 and the second harness 52 by means of the surfaces of the jackets of the harnesses 51 and 52 in addition to the guide rib 72. The harness guide 100 having such a structure can be easily applied even to a housing having a space in its inside.

Also, the connecting portion of the first side surface 73a (the second surface F2) and the second side surface 74a of the guide rib 72 are connected smoothly in an arc shape. Therefore, even if a harness (for example, the second harness 52) moves while contacting with this connecting portion, the jacket of the harness is less likely to be damaged. In addition, even if a harness (for example, the first harness 51) moves while contacting with the first surface F1, the jacket of the harness is less likely to be damaged since the first surface F1 is chamfered in an arc shape.

Further, the guide rib 72 is formed integrally with the wall rib 70. Therefore, even if a strong force is applied to the guide rib 72 from the first harness 51 and the second harness 52, the guide rib 72 is less likely to break down since this force can be received by both the guide rib 72 and the wall rib 70.

Furthermore, as understood from, for example, FIG. 8, it is possible to make the second harness 52 curved smoothly from the passage P toward the first opening AP1 by bringing the second harness 52 close to the first engaging portion 64 by means of the guide rib 72 and the first harness 51. In addition, it is possible to make the first harness 51 curved smoothly from the passage P toward the peripheral wall 25d by bringing the first harness 51 close to the first engaging portion 65 by means of the guide rib 72 and the second harness 52. By making the curvature smooth in such a manner, it is possible to ease a damage caused by the movement of the first harness 51 and the second harness 52.

In addition to the above explanation, various preferable effects can be obtained from the structure disclosed in the present embodiment.

Note that the structure disclosed in the present embodiment can be deformed appropriately.

For example, a notebook portable computer is disclosed as an example of the electronic device 1 in the present embodiment. However, the structure of the harness guide 100 is widely applicable to various devices such as a portable media player, a cell phone device, a game console, an electronic dictionary, a television receiver and a slate portable computer (slate PC or tablet). In these electronic devices, a plurality of housings may be slidably or removably connected, not necessarily pivotally connected by a hinge, etc.

Also, the structure of the harness guide 100 is applicable to an electronic device including only a housing. Further, the structure of the harness guide 100 can be embodied by a manner other than providing an electronic device. For example, the harness guide 100 may be provided in a vehicle, a ship, an aircraft, an elevator or other structures in order to guide a plurality of harnesses.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising: a first harness configured to electrically connect a first module and a second module; a second harness configured to electrically connect a third module and a fourth module; a first housing configured to hold the first module and the third module, and comprising a wall portion with a passage through which the first harness and the second harness pass, and a rib; and a second housing which accommodates accommodating the second module and the fourth module, wherein the rib comprises a first surface configured to control movement of the first harness only in a first direction with the wall portion, and a second surface configured to control movement of the second harness only in a second direction with the wall portion and an outer surface of the first harness, wherein the first direction is a thickness direction of the first housing and the second direction is a vertical direction of the first housing and perpendicular to the first direction; and the first harness and the second harness pass through the passage in a third direction different from the first direction and the second direction.

2. The electronic device of claim 1, wherein
the rib comprises a first portion and a second portion;
the first portion and the second portion protrude in the first direction from an inner surface of the first housing;
the first surface comprises a tip surface facing the first direction; and
the second surface comprises a first side surface of the first portion.

3. The electronic device of claim 2, wherein
the second portion comprises a second side surface along the second direction; and the first side surface and the second side surface are connected in an arc shape.

4. The electronic device of claim 2, wherein the tip surface is chamfered in an arc shape.

5. The electronic device of claim 1, wherein the first housing comprises a cover, to which at least one of the first module and the second module is attached, and a mask associated with the rib and attached to the cover.

6. The electronic device of claim 5, wherein the mask comprises a structure comprising protrusions in the first direction, the structure attaching the mask to the cover; and the rib is integrated with the structure.

7. The electronic device of claim 1, wherein the first housing comprises a first opening;

the second housing comprises a second opening, further comprising a hinge pivotally connecting the first housing and the second housing via an axis which passes through the first opening and the second opening; and at least either of the first harness or the second harness passes through the first opening and the second opening.

8. The electronic device of claim 1, wherein at least either of the first module or the third module is a display device comprising a touch panel.

* * * * *